(12) United States Patent
Miller (10) Patent No.: US 8,403,313 B2
(45) Date of Patent: Mar. 26, 2013

(54) WORK TABLE HAVING ELEVATED SUPPORT MEMBERS

(75) Inventor: Mark T. Miller, Santa Monica, CA (US)

(73) Assignee: Hagar Tools, Inc., Santa Monica, CA (US)

( * ) Notice: Subject to any disclaimer, the term of this patent is extended or adjusted under 35 U.S.C. 154(b) by 33 days.

(21) Appl. No.: 12/857,097

(22) Filed: Aug. 16, 2010

(65) Prior Publication Data

US 2011/0036956 A1    Feb. 17, 2011

Related U.S. Application Data

(60) Provisional application No. 61/233,919, filed on Aug. 14, 2009.

(51) Int. Cl.
*B25B 1/02* (2006.01)

(52) U.S. Cl. .......................... 269/139; 269/244; 269/295

(58) Field of Classification Search .................. 269/139, 269/244, 295
See application file for complete search history.

(56) References Cited

U.S. PATENT DOCUMENTS

| 4,570,915 | A | * | 2/1986 | O'Hern | 269/295 |
| 6,089,555 | A | * | 7/2000 | Lin | 269/139 |
| 6,401,865 | B1 | * | 6/2002 | Elwick | 182/182.1 |

* cited by examiner

*Primary Examiner* — Lee D Wilson
*Assistant Examiner* — Shantese McDonald
(74) *Attorney, Agent, or Firm* — Suiter Swantz pc llo (57) ABSTRACT

A work bench having elevated support members. The work bench may comprise a generally rectangular frame defined by two elongated members and two side members; a support base for supporting the generally rectangular frame in a generally horizontal plane; a plurality of cross members disposed in between the two side members, each of the plurality of cross members being generally parallel to the two side members and being coupled to the two elongated members; and a plurality of raised blocks located on top of each of the two side members and each of the plurality of cross members, wherein the plurality of raised blocks located on each of the two side members are distributed substantially evenly along each of the two side members, and the plurality of raised blocks located on each of the plurality of cross members are distributed substantially evenly along each of the plurality of cross members.

17 Claims, 11 Drawing Sheets

WORK TABLE HAVING ELEVATED SUPPORT MEMBERS

CROSS-REFERENCE TO RELATED APPLICATIONS

The present application claims the benefit under 35 U.S.C. §119(e) of U.S. Provisional Application Ser. No. 61/233,919, filed Aug. 14, 2009. Said U.S. Provisional Application Ser. No. 61/233,919 is hereby incorporated by reference in its entirety.

TECHNICAL FIELD

The disclosure generally relates to the field of work tables/benches, particularly to a work table having elevated support members.

BACKGROUND

Work tables/benches may be utilized for building and construction jobs. They may range from simple flat surfaces to complex designs, and may provide work surfaces for supporting objects.

SUMMARY

The present disclosure is directed to a work bench. The work bench may comprise a generally rectangular frame defined by two elongated members and two side members; a support base for supporting the generally rectangular frame in a generally horizontal plane; a plurality of cross members disposed in between the two side members, each of the plurality of cross members being generally parallel to the two side members and being coupled to the two elongated members; and a plurality of raised blocks located on top of each of the two side members and each of the plurality of cross members, wherein the plurality of raised blocks located on each of the two side members are distributed substantially evenly along each of the two side members, and the plurality of raised blocks located on each of the plurality of cross members are distributed substantially evenly along each of the plurality of cross members.

A further embodiment of the present disclosure is also directed to a work bench. The work bench may comprise a generally rectangular frame defined by two elongated members and two side members; at least one cross member disposed in between the two side members, the at least one cross member being generally parallel to the two side members and being coupled to the two elongated members; and a plurality of elevated support members located on top of each of the two side members and each of the at least one cross member.

An additional embodiment of the present disclosure is directed to an apparatus. The apparatus may comprise a support base; a plurality of generally parallel support arrangements supported by the support base, each of the plurality of generally parallel support arrangements comprises a plurality of raised portions; wherein the plurality of raised portions are distributed substantially evenly along each of the plurality of generally parallel support arrangements, the plurality of raised portions are configured for supporting a working material and elevating the working material above the support base.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Referring generally to FIGS. 1 through 4, an apparatus 100 (work table/bench) having elevated support members (raised blocks) 102 is shown. In one embodiment, the work table 100 includes a frame 104 defined by two elongated members 106 and two side members 108. The frame 104 may be made of various types of rigid materials such as wood, medal (e.g., aluminum or aluminum alloy) and/or plastic. The work table 100 also may include a support base configured for supporting the frame 104. The support base may include a plurality of legs 112 configured for supporting the frame 104. The frame 104 may be supported in a generally horizontal manner. Alternatively, the frame 104 may be supported by other means. For example, the support base may be a supporting surface, a stand or the like.

The work table 100 includes one or more cross members 110 disposed in between the two side members 108. The cross members 110 are coupled to the two elongated members 106 and are generally perpendicular to the two elongated members 106. A plurality of elevated support members 102 are positioned on top of the two side members 108 and the cross members 110. The elevated support members 102 (may be referred to as spacers, blocks or risers) are configured for providing elevated support (e.g., one or two inches above the frame 104) for objects placed on the work table. The elevated support members 102 may also be utilized to assist securing the objects to the work table 100.

In one embodiment, the frame 104 is configured in a generally rectangular configuration. The cross members 110 are disposed substantially evenly in between the two side members 108 and are fixedly coupled to the two elongated members 106. In addition, the elevated support members 102 located on the two side members 108 may be distributed substantially evenly along each side members. The elevated support members 102 located on each cross member 110 may also be distributed substantially evenly along each cross member 110. In this manner, the frame 104 is configured with evenly spaced cross members 110 on which sit evenly spaced elevated support members 102.

The elevated support members 102 may provide elevated support for working materials (e.g., wood board, glass, drywall, etc). Elevated support of the working materials may provide users with more work space underneath the working materials. For example, a circular saw may be utilized for cutting through a board placed on the work table 100 without contacting the work table. In another example, the work table may allow symmetrical pathways for a saw blade to pass in contrasting directions. Furthermore, the elevated support members 102 spaced apart may allow the saw blade to traverse through the working material above the cross members 110.

The elevated support members (raised blocks) 102 may be configured to have a uniform height. For example, the height of the elevated support members 102 may be at least one inch in order to provide adequate space for movements of a saw blade. In one embodiment, the elevated support members 102 are configured as rectangular blocks. Each rectangular block may have a height between approximately one to two inches, a width between approximately one to two inches, and a length between approximately four to eight inches. It is understood that various other shapes and configurations may be utilized to realize the elevated support members 102 without departing from the spirit and scope of the present disclosure.

The elevated support members 102 located on each cross member 110 are spaced apart in order to allow a saw blade and the like to traverse through the working material above the cross members 110. In one embodiment, separation distance between two adjacent elevated support members 102 located on the same cross members 110 is between approximately three to six inches. In addition, two adjacent elevated support members 102 located on the two side members 108 may be separated by the same amount.

It is contemplated that additional side spacers may be placed on the side of the frame 104. For example, side spacers may be attached to one side of the table to allow floor standing materials (e.g., a door or a large panel) to be clamped vertically. It is also contemplated that additional attachments may be provided for the work table of the present disclosure. For example, a removable tool tray may be suspended horizontally from the frame of the work table for temporary tool placement. The tool tray may be disassembled and stored in one of the legs for storage.

Referring generally to FIGS. 5 through 8, a foldable work table 500 having elevated support members 102 is shown. In one embodiment, the foldable work table 500 includes two or more interconnected frames 502 and 504. Each of the frame 502 and frame 504 is defined by two elongated members 506 and two side members 508. Each of the frame 502 and frame 504 may include one or more cross members 510 generally perpendicular to the two elongated members 506. The cross members 510 are disposed in between the side members 508 and are coupled to the elongated members 506. A plurality of elevated support members 102 are positioned on top of the side members 508 and the cross members 510.

Figure 1:
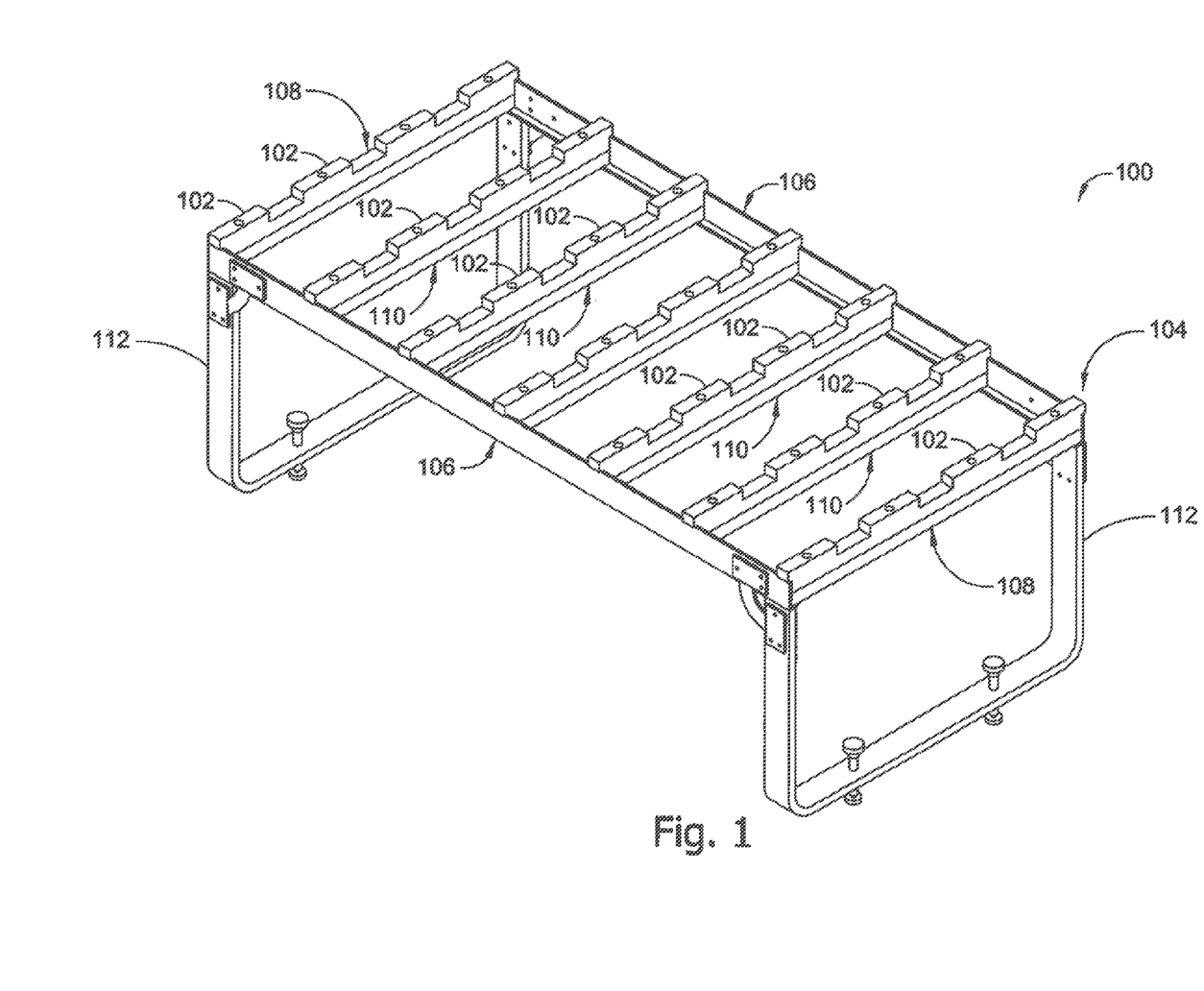
FIG. 1 is an isometric view of a work table having elevated support members.
Figure 2:
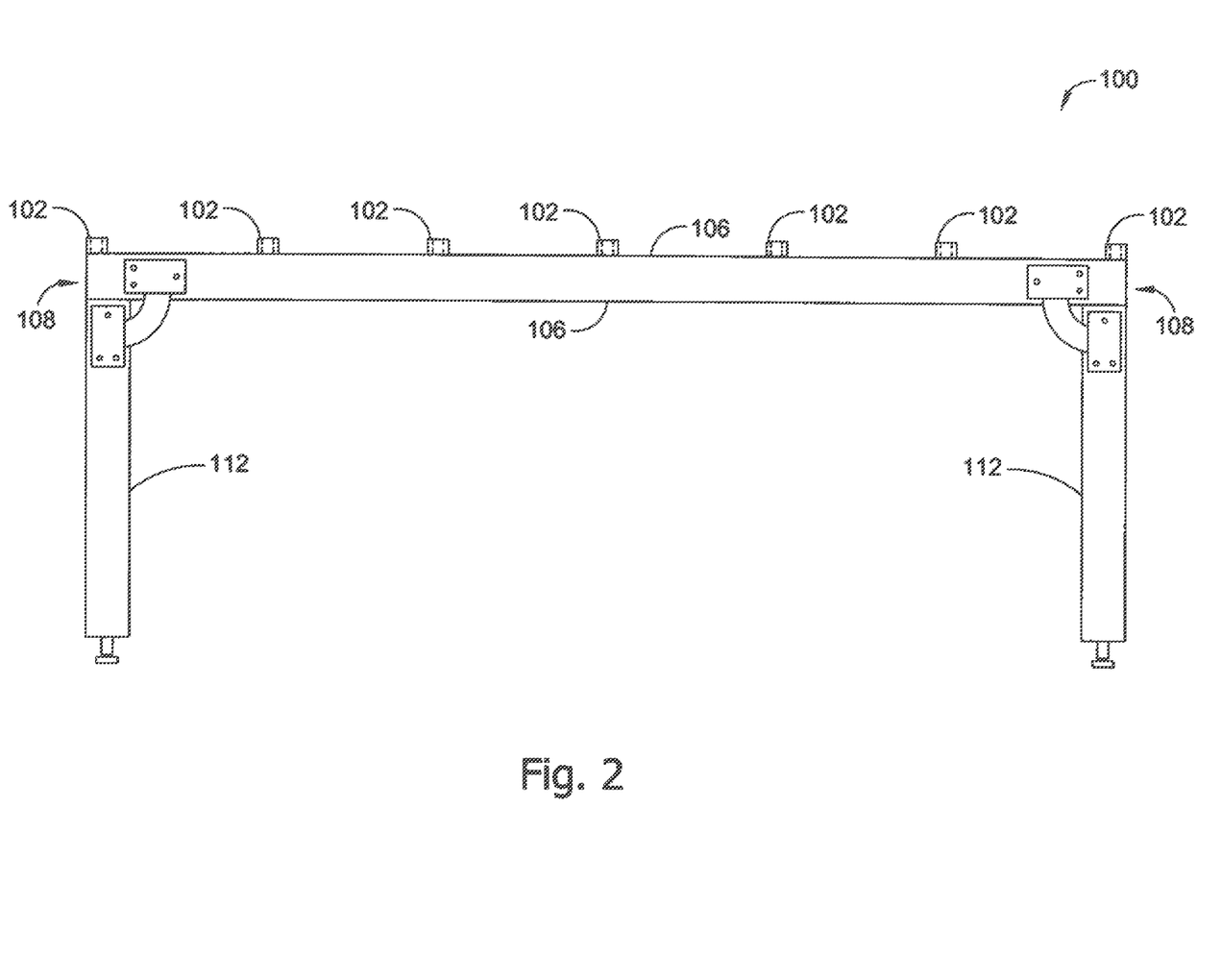
FIG. 2 is a side view of a work table having elevated support members.
Figure 3:
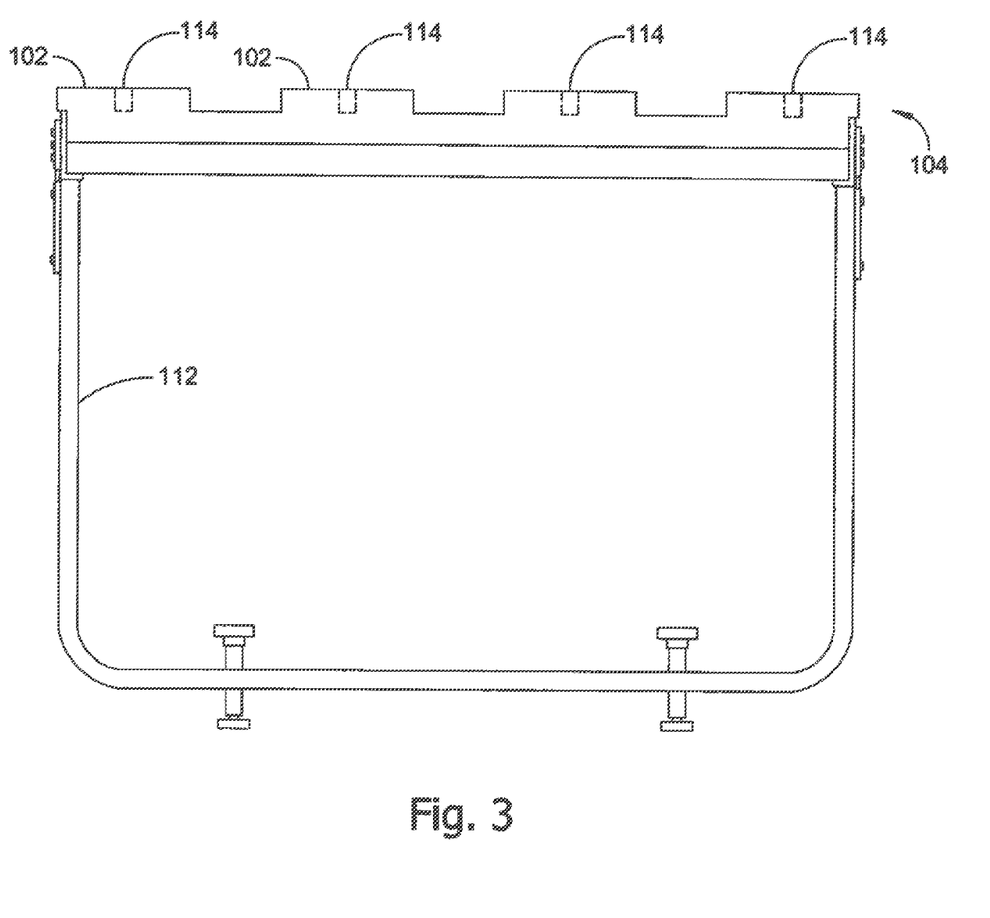
FIG. 3 is another side view of a work table having elevated support members.
Figure 4:
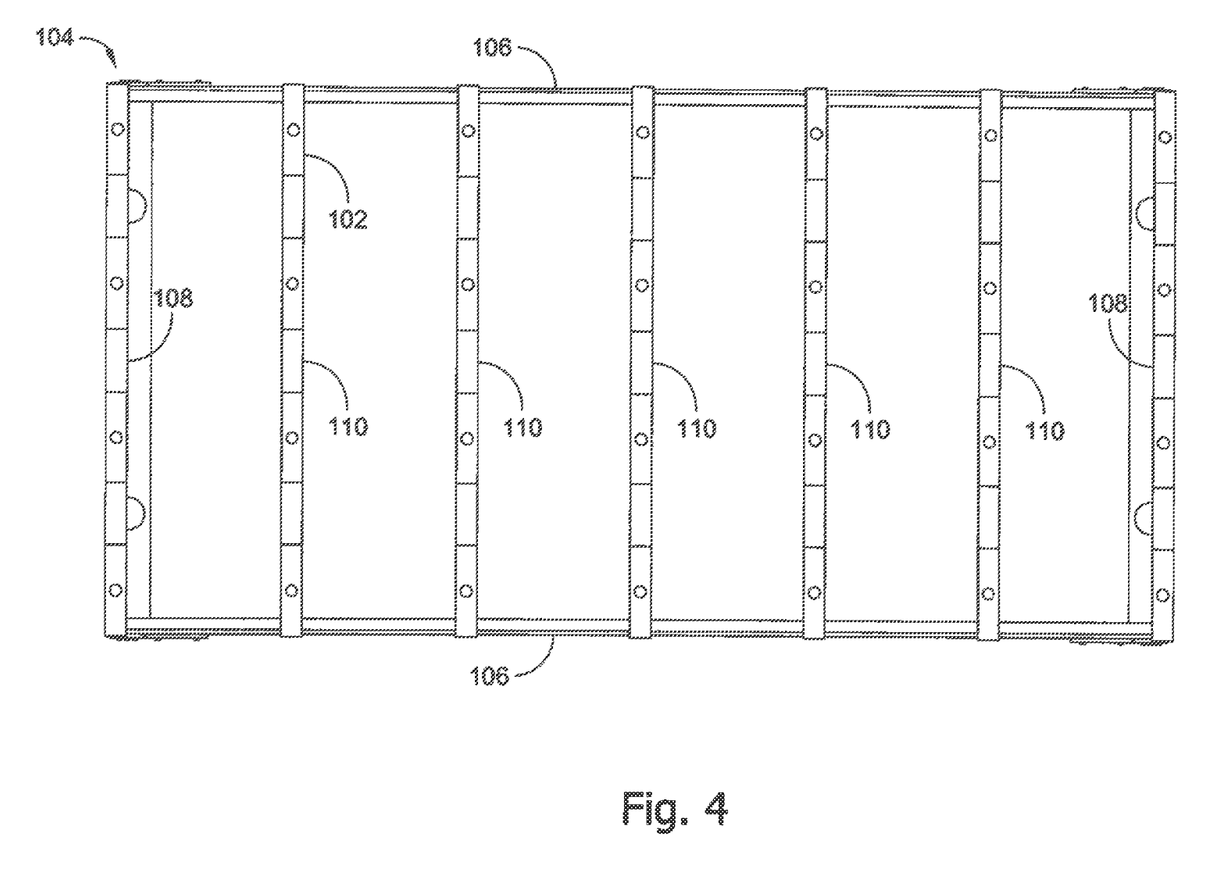
FIG. 4 is a top view of a work table having elevated support members.
Figure 5:
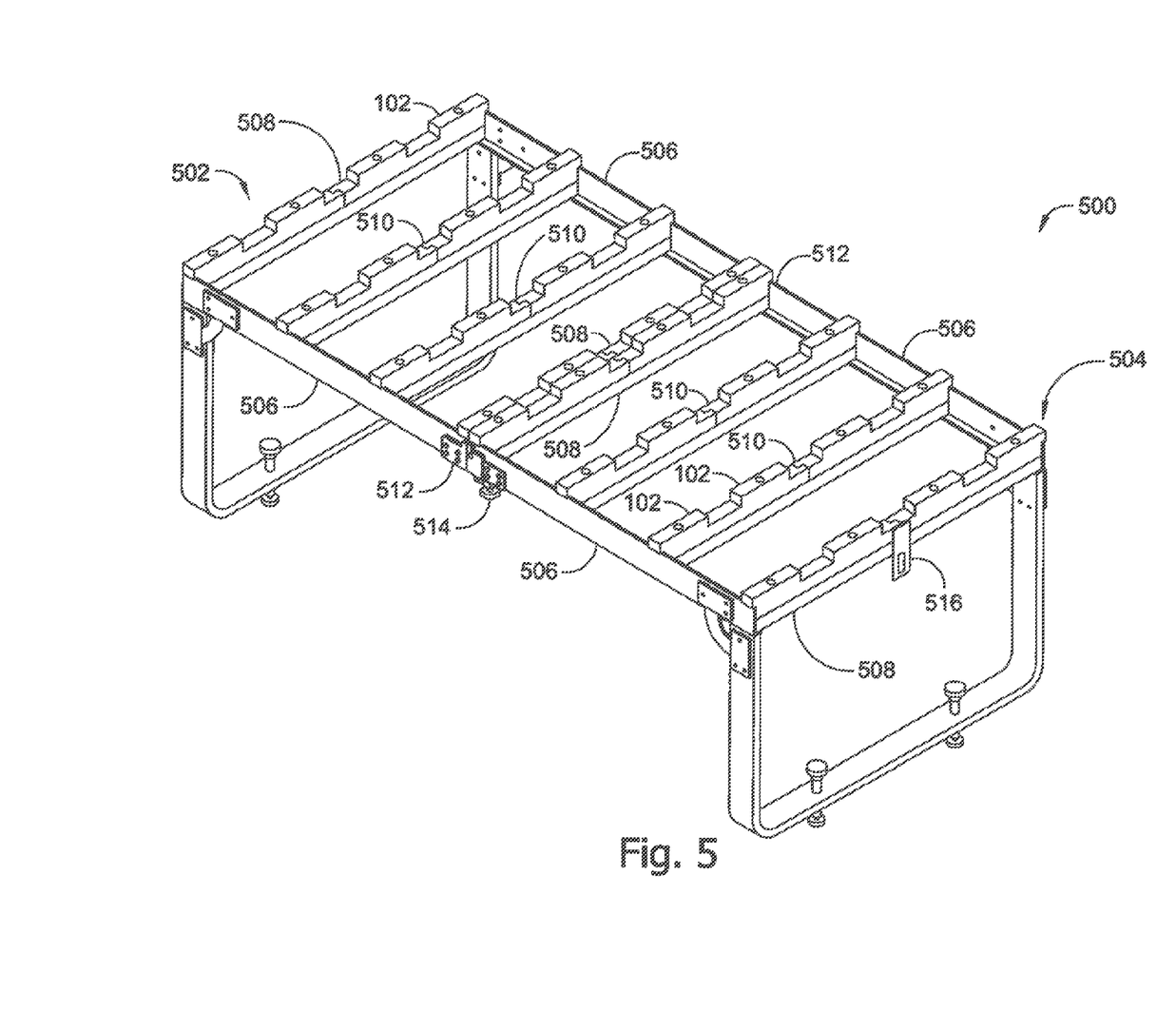
FIG. 5 is an isometric view of a foldable work table having elevated support members.
Figure 6:
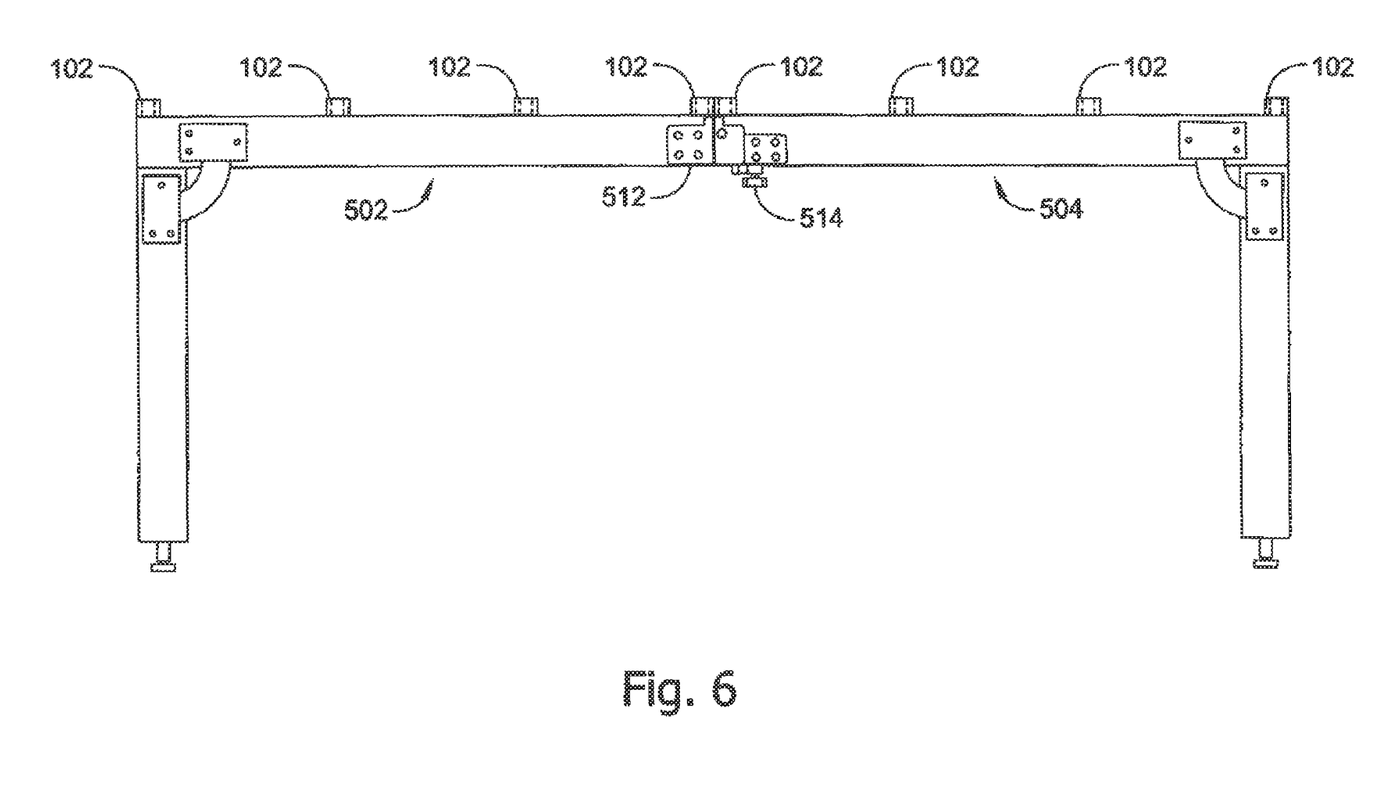
FIG. 6 is a side view of a foldable work table having elevated support members.
Figure 7:
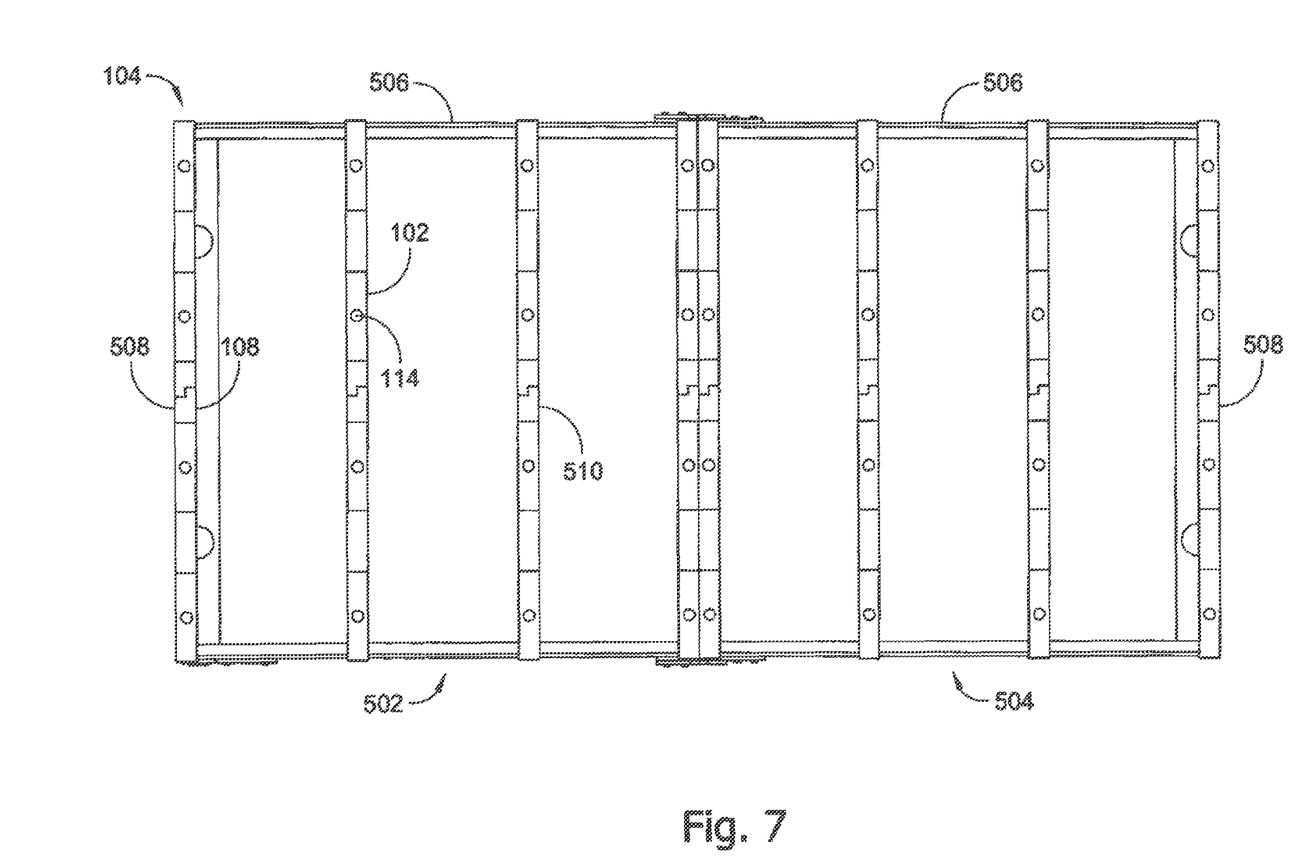
FIG. 7 is a top view of a foldable work table having elevated support members.
Figure 8:
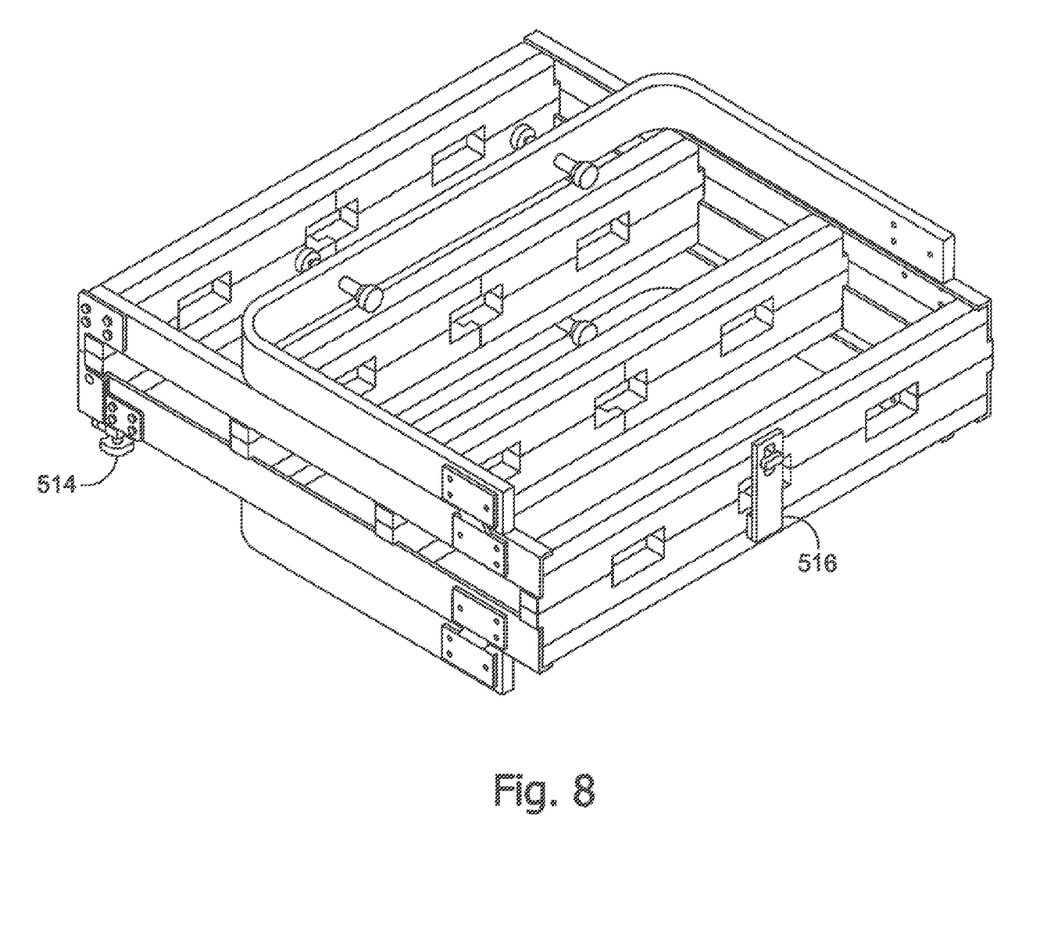
FIG. 8 is an isometric view of a foldable work table having elevated support members, wherein foldable work table is in a folded position.

A plurality of connectors 512 may be utilized for pivotally connecting the frames 502 and 504. The frames 502 and 504 may be positioned in an extended position (as illustrated in FIGS. 5 through 7) or a folded position (as illustrated in FIG. 8). In one embodiment, a knob 514 may be utilized for securing/locking the frames 502 and 504 in the extended position. It is understood that other types of securing means may be utilized.

The foldable work table 500 may be folded as illustrated in FIG. 8. In one embodiment, the legs may be pivotally coupled to the frames 502 and 504, allowing the legs to be placed in a folded position. The frames 502 and 504 may also be folded along the connectors 512. A lock 516 may be provided for securing the frames 502 and 504 in the folded position. It is understood that the foldable work table 500 illustrated in FIGS. 5 through 8 is merely exemplary. Various other foldable designs may be utilized without departing from the spirit and scope of the present disclosure.

Figure 9:
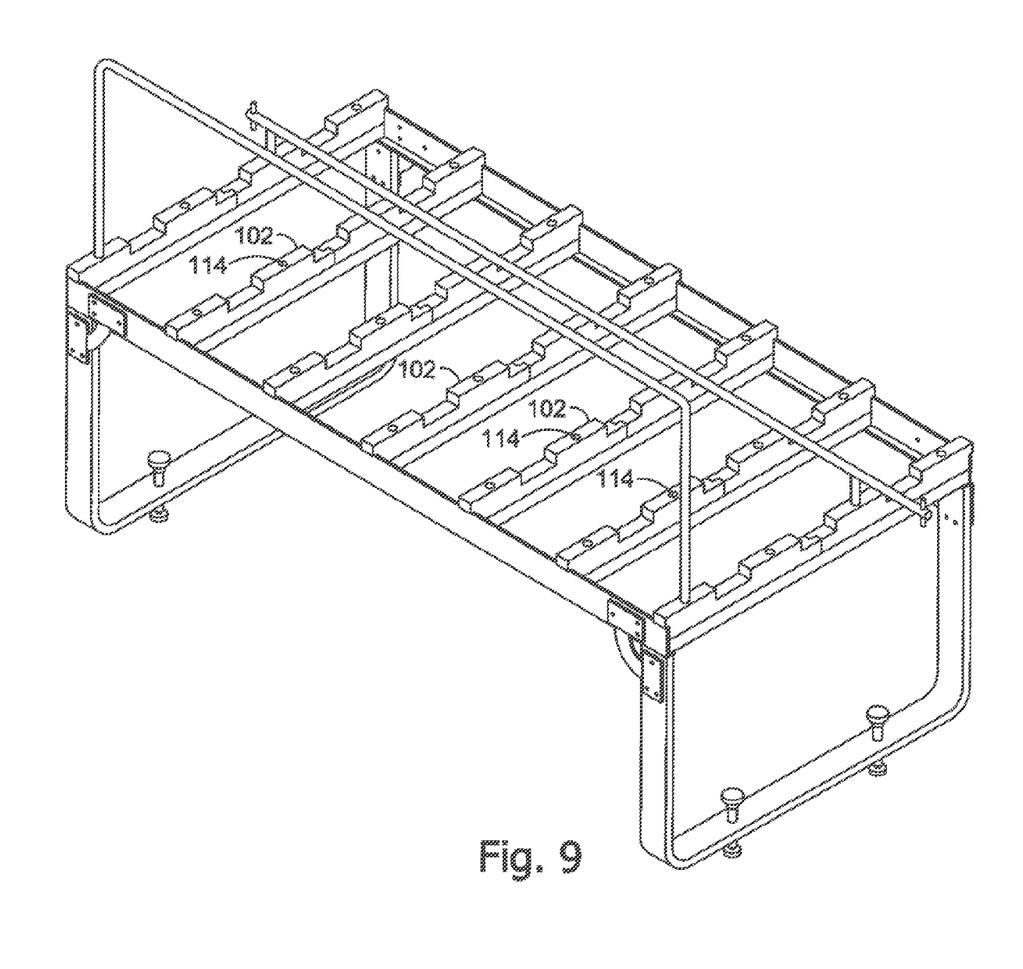
FIG. 9 is an isometric view of a work table with attachments installed.

Referring generally to FIG. 9, in one embodiment, each elevated support member 102 may also include at least one opening 114 configured for receiving an attachment. For example, the opening 114 may be configured as a hole, a recess, or a slit that is located in the center of the elevated support member 102. The openings 114 may be utilized for inserting pegs for lifting working materials off the table to an additional height. Other attachments may also be inserted/attached to the elevated support members 102 utilizing the openings 114. Such attachments may include, but are not limited to, vertical clamping walls, cord whips, lumber racks, table saws, and various accessories such as hanging bars for painting and chop saw attachments.

It is contemplated that the elevated support members (raised blocks) 102 may be removably attached (e.g., using screws, clamps, or any kinds of fasteners/adhesives) to the side members 108 and the cross members 110. Alternatively, the elevated support members 102 may be an integrated portion of the side member 108 and/or the cross members 110. For example, the side member 108 and/or the cross members 110 may be molded as a part of the elevated support members 102.

Figure 10:
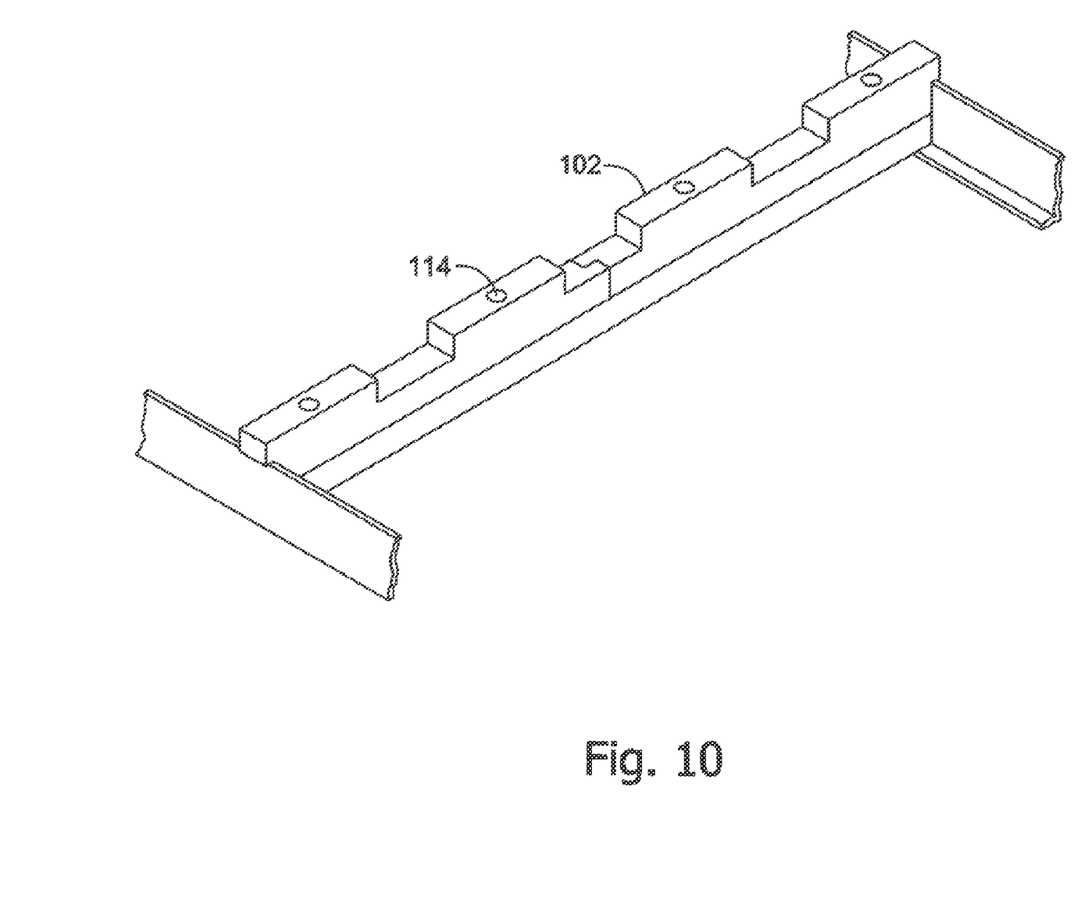
FIG. 10 is a partial isometric view of a work table illustrating details of an elevated support member.

It is also contemplated that each of the side members 108 and the cross members 110 may be configured as a single-piece unit or a multi-piece assembly. FIG. 10 illustrates an exemplary multi-piece cross member assembly. In a multi-piece assembly configuration, snap-fit mechanisms or other types of fasteners/aligners may be utilized to facilitate coupling of the components to form the cross member. It is understood that the side member assemblies may be configured similarly. It is also understood that various other multi-piece assembly configurations may be utilized without departing from the spirit and scope of the present disclosure.

Figure 11:
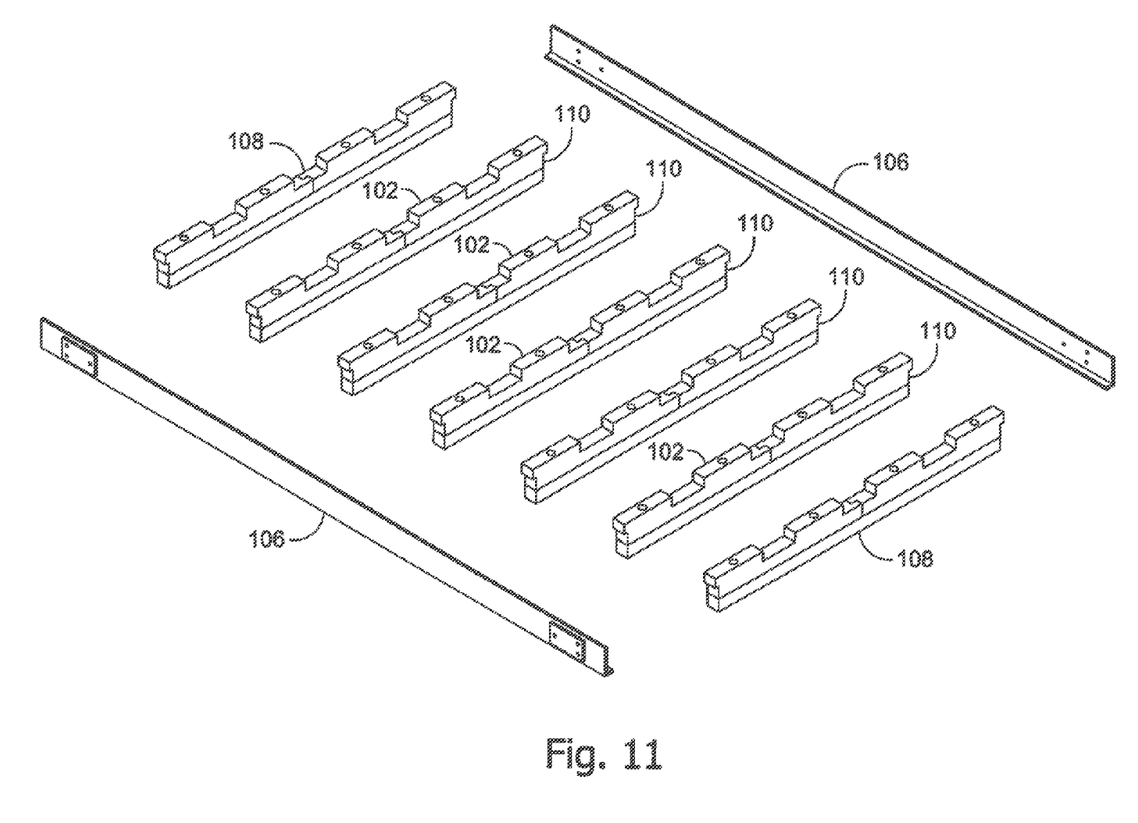
FIG. 11 is an exploded view of a work table frame having elevated support members.

FIG. 11 illustrates an exploded view of the work bench frame in accordance with the present disclosure. In one embodiment, the side members 108 and the cross members 110 are configured in a substantially similar manner. The side members 108 and the cross members 110 may be supported by a support base such as legs, a surface, a stand or the like. The side members 108 and the cross members 110 form a plurality of generally parallel support arrangements, where each support arrangement includes a plurality of raised portions 102. The raised portions are configured for supporting a working material and elevating the working material above the support base. The support arrangements may be coupled with the elongated members 106 to form a work bench frame. The work bench frame may be of any geometrical shapes. In one embodiment, the work bench frame forms a generally rectangular shape.

It is believed that the system and method of the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory.

What is claimed is:

1. A work bench, comprising:
a generally rectangular frame defined by two elongated members and two side members;
a support base for supporting the generally rectangular frame in a generally horizontal plane;
a plurality of cross members disposed in between the two side members, each of the plurality of cross members being generally parallel to the two side members and being coupled to the two elongated members; and
a plurality of generally rectangular raised blocks located on top of each of the two side members and each of the plurality of cross members, the plurality of generally rectangular raised blocks configured for providing direct support for a work material and elevating the work material above the support base,
wherein the plurality of generally rectangular raised blocks located on each of the two side members are distributed substantially evenly along each of the two side members, the plurality of generally rectangular raised blocks located on each of the plurality of cross members are distributed substantially evenly along each of the plurality of cross members, and each of the plurality of generally rectangular raised blocks includes an opening configured for receiving an attachment.

2. The work bench of claim 1, wherein the plurality of cross members are disposed substantially evenly in between the two side members.

3. The work bench of claim 1, wherein each of the plurality of raised blocks is configured to have a uniform height, the uniform height being between approximately one to two inches.

4. The work bench of claim 1, wherein each of the plurality of generally rectangular raised blocks has a height between approximately one to two inches, a width between approximately one to two inches, and a length between approximately four to eight inches.

5. The work bench of claim 1, wherein two adjacent raised blocks located on each of the two side members define a separation distance, and two adjacent raised blocks located on each of the plurality of cross members define substantially the same separation distance, the separation distance being between approximately three to six inches.

6. The work bench of claim 1, wherein
the plurality of raised blocks located on each of the two side members are at least one of: removably attached to each of the two side members; and integrated into at least a portion of each of the two side members; and
the plurality of raised blocks located on each of the plurality of cross members are at least one of: removably attached to each of the plurality of cross members; and integrated into at least a portion of each of the plurality of cross members.

7. A work bench, comprising:
a generally rectangular frame defined by two elongated members and two side members;
at least one cross member disposed in between the two side members, the at least one cross member being generally parallel to the two side members and being coupled to the two elongated members; and
a plurality of generally rectangular elevated support members located on top of each of the two side members and each of the at least one cross member, each of the plurality of generally rectangular elevated support members includes an opening configured for receiving an attachment, and the plurality of generally rectangular elevated support members configured for providing direct support for a work material and elevating the work material above the rectangular frame.

8. The work bench of claim 7, wherein the plurality of elevated support members located on each of the two side members are distributed substantially evenly along each of the two side members, and the plurality of elevated support members located on each of the at least one cross member are distributed substantially evenly along each of the at least one cross member.

9. The work bench of claim 7, wherein the at least one cross member comprises a plurality of cross members, the plurality of cross members are disposed substantially evenly in between the two side members.

10. The work bench of claim 7, wherein each of the plurality of elevated support members is configured to have a uniform height, the uniform height being at least approximately one inch.

11. The work bench of claim 7, wherein each of the plurality of generally rectangular elevated support members has a height of at least approximately one inch.

12. The work bench of claim 7, wherein two adjacent elevated support members located on each of the two side members define a separation distance, and two adjacent elevated support members located on each of the at least one cross member define substantially the same separation distance, the separation distance being between approximately three to six inches.

13. The work bench of claim 7, wherein
the plurality of elevated support members located on each of the two side members are at least one of: removably attached to each of the two side members; and integrated into at least a portion of each of the two side members; and
the plurality of elevated support members located on each of the at least one cross member are at least one of: removably attached to each of the at least one cross member; and integrated into at least a portion of each of the at least one cross member.

14. An apparatus, comprising:
a support base;
a plurality of generally parallel support arrangements supported by the support base, each of the plurality of generally parallel support arrangements comprises a plurality of generally rectangular raised portions, each of the plurality of generally rectangular raised portions having an opening configured for receiving an attachment;
wherein the plurality of generally rectangular raised portions are distributed substantially evenly along each of the plurality of generally parallel support arrangements, the plurality of generally rectangular raised portions are configured for supporting a working material and elevating the working material above the support base.

15. The apparatus of claim 14, wherein each of the plurality of raised portions is configured to have a uniform height, the uniform height being at least approximately one inch.

16. The apparatus of claim 14, wherein each of the plurality of generally rectangular raised portions has a height of at least approximately one inch.

17. The apparatus of claim 14, wherein two adjacent raised portions of each of the plurality of generally parallel support arrangements define a separation distance, the separation distance being between approximately three to six inches.

* * * * *